United States Patent
Hoyer

(10) Patent No.: US 6,614,513 B2
(45) Date of Patent: Sep. 2, 2003

(54) APPARATUS AND METHOD FOR MEASURING THE CHROMATIC DISPERSION OF AN OPTICAL TRANSMISSION LINK

(75) Inventor: Wolfgang Hoyer, Pfullingen (DE)

(73) Assignee: Acterna Eningen GmbH, Eningen (DE)

(*) Notice: Subject to any disclaimer, the term of this patent is extended or adjusted under 35 U.S.C. 154(b) by 0 days.

(21) Appl. No.: 10/075,937

(22) Filed: Feb. 13, 2002

(65) Prior Publication Data

US 2002/0118356 A1 Aug. 29, 2002

(30) Foreign Application Priority Data

Feb. 16, 2001 (EP) .......................................... 01103820

(51) Int. Cl.[7] .............................................. G01N 21/00
(52) U.S. Cl. ..................................................... 356/73.1
(58) Field of Search ........................ 356/73.1; 359/110, 359/124, 118, 326, 485, 850

(56) References Cited

U.S. PATENT DOCUMENTS

| 5,969,806 A | 10/1999 | Bergano | 356/73.1 |
| 6,154,273 A | * 11/2000 | Suzuki | 356/73.1 |
| 6,313,934 B1 | * 11/2001 | Fortenberry | 359/172 |

FOREIGN PATENT DOCUMENTS

| DE | 3409310 A1 | 9/1985 |
| EP | 0 280 328 A2 | 8/1988 |

* cited by examiner

Primary Examiner—Tu T. Nguyen
(74) Attorney, Agent, or Firm—Reed Smith LLP

(57) ABSTRACT

In a method for measuring the chromatic dispersion of a light waveguide an amplitude modulated broadband optical signal is fed into the optical transmission link to be measured, the transmitted signal is separated into a reference path, in which the modulation frequency is demodulated out of the transmitted signal, and a measuring path, in which the transmitted signal is demodulated at several optical frequencies respectively, and the chromatic dispersion of the optical transmission link is determined from the phase differences between the several demodulated signals of the measuring path and the demodulated signal of the reference path.

9 Claims, 2 Drawing Sheets

APPARATUS AND METHOD FOR MEASURING THE CHROMATIC DISPERSION OF AN OPTICAL TRANSMISSION LINK

BACKGROUND OF THE INVENTION

The invention concerns a method and a device for measuring the chromatic dispersion of an optical transmission link.

Since the refractive index of optical glass fibers depends on the wavelength, different propagation velocities are obtained for signals with different wavelengths. This may result in the spectral components of a modulated optical signal not arriving simultaneously at the far end, and in signal distortions.

The group delay time $t_g$ is used as a measure for the propagation time of a signal component. The derivation of the group delay time $t_g$ by the wavelength $\lambda$ referred to the length L of the fibers is called chromatic dispersion coefficient D: $D=1/L*dt_g/d\lambda$.

The measuring methods commonly used ("Modulation Phase-Shift Method", "Differential Phase-shift Method") are based on the classical Nyquist method for measuring the group delay time. The optical carrier signal is amplitude modulated with a frequency $\omega$, which is small compared to the carrier frequency. In the 1550 nm range the optical frequencies are at about 200 THz, such that this requirement is met for modulation frequencies up to the high GHz range. The modulation frequency is recovered at the end of the test sample by demodulation and its phase position is compared to that of the modulation source. According to Nyquist the group delay time is then obtained as : $t_g=\Delta\beta/\omega$.

For determining the chromatic dispersion, the group delay time must be determined in dependence on the wavelength and then the derivation of the group delay time by the wavelength must be calculated.

In practice, one often works with few discrete wavelengths, such that the chromatic dispersion is only determined approximately. The required number and distance of the wavelengths depends on the test sample. For glass fibers relatively coarse wavelength steps of about 5 or 10 nm are sufficient. For narrowband test samples, for example dispersion compensators with chirped fiber Bragg gratings, significantly smaller step sizes are necessary (for example <0.5 nm).

The classical measurement setup or the Nyquist method uses a tuneable laser source and a downstream (external) modulator. As modulation frequencies one finds values in the range 50 MHz to several GHz, which again makes necessary a powerful high frequency source and a broadband photo detector. The entire kit thus becomes relatively expensive. Furthermore, such setups are not suitable for end-to-end measurements, since the modulation signal on the sending side must be fed to the evaluation side as a reference. In known solutions this occurs electrically or optically via an additional cable connection.

The object of the present invention is to provide a method and an apparatus for measuring the chromatic dispersion of an optical transmission link without additional reference connection.

SUMMARY OF THE INVENTION

The aforementioned object is solved according to the invention by a method for measuring the chromatic dispersion of an optical transmission link, preferably of a light waveguide, wherein an amplitude modulated broadband optical signal is fed into the optical transmission link to be measured, wherein the transmitted signal is separated into a reference path, in which the modulation frequency is demodulated out of the transmitted signal, and into a measuring path, in which the transmitted signal is demodulated at several optical frequencies respectively, and wherein the chromatic dispersion of the optical transmission link is determined from the phase differences between the several demodulated signals of the measuring path and the demodulated signal of the reference path.

According to the invention an optical broadband source can, for example, be provided on the sending side, which source is amplitude modulated with a high frequency oscillation. The transmitted optical signal is separated at the receiving side as a reference signal into a reference path and as measurement signal into a measuring path. The reference signal passes through a broadband optical filter, and then the modulation signal is recovered with a photo detector, which modulation signal serves as a reference for a phase indication. The measuring signal passes through a tuneable narrowband optical filter, and there also, the modulation signal is recovered with a photo detector, wherein the phase position of the modulation signal differs from the reference signal due to chromatic dispersion. From the change of the phase difference at different positions of the narrow band optical filter, the chromatic dispersion is then determined.

The individual measuring signals obtained at the several optical frequencies are each significantly weaker than the reference signal. This signal difference can be reduced by coupling the transmitted signal for the most part, preferably at least 80%, into the measuring path.

Preferably, for measuring the phase difference, the demodulated signals are first transferred to a lower frequency range.

The aforementioned object is also solved according to the invention by an apparatus for measuring the chromatic dispersion in an optical transmission link, preferably of a light waveguide, with an amplitude modulated, broadband light source at the input side of the optical transmission link to be measured, with a device which separates the transmitted optical signal into a reference path and a measuring path, with a tuneable narrowband optical filter provided in the measuring path, with a photo detector in the reference path and in the measuring path respectively and with a phase measuring device provided at the output side of the two photo detectors for determining the phase differences respectively present between the reference and measuring path, from which the chromatic dispersion of the optical transmission link can be determined. The tuneable narrowband optical filter is disposed in the measuring path in order to be able to analyze the measuring signal in dependence on the wavelength. For this purpose, the bandwidth of the light source should be at least one magnitude larger than the respective filter bandwidth of the tuneable optical filter.

In the reference path a broadband optical filter may be required upstream of the photo detector in order to constrict the optical bandwidth of the transmitted signal such that cancelling out of the modulation signal due to chromatic dispersion is avoided. In practice, the bandwidth of the broadband optical filter could, for example, be 30 nm. In many cases such a broadband optical filter is not necessary if the amplitude modulated light source is suitably chosen (for example a light source with a limited bandwidth).

Preferably, a frequency source is connected to the reference path and the measuring path, which transfers the demodulated signals of both paths, for example 20 MHz signals, into a lower frequency range by frequency mixing, for example into the kHz range. Theoretically, the requirements for the phase sensitivity of the frequency source are small, since its influence is effective in the reference path and the measuring path and is cancelled out during phase measurement. The transferred signals are amplified and constricted, such that the amplitude of the measuring signal does not enter the measuring result.

Known phase meters only have a limited measuring range of, for example, 360°. For larger phase values the output voltage of the phase meter jumps back, for example to the value at 0°, in order to rise again to its maximum value at 720° etc. This ambiguous behaviour with irregularities in the phase meter characteristic aggravates the analysis. In preferred embodiments of the inventive measuring apparatus the phase measuring device therefore comprises two phase meters, the characteristic curves of which are offset to one another, preferably by 180°. This arrangement with two phase meters operating at an offset has the advantage that always at least one phase meter operates at a safe distance of such an irregularity. This is particularly important, if the signals to be analyzed are disturbed by noise. Since only small phase differences and small wavelength differences are analyzed for determining the chromatic dispersion, a phase meter with a large continuous measuring range is also not necessary. Instead, the proposed arrangement of two phase meters with limited measuring range operating at an offset obtain a higher resolution and measuring accuracy.

Additional advantages of the invention can be gathered from the description and the drawing. Also, the previously mentioned and the following characteristics can be used according to the invention each individually or collectively in any combination. The embodiments shown and described are not to be taken as a conclusive enumeration, but have exemplary character for the description of the invention.

DETAILED DESCRIPTION OF THE INVENTION

Figure 1:
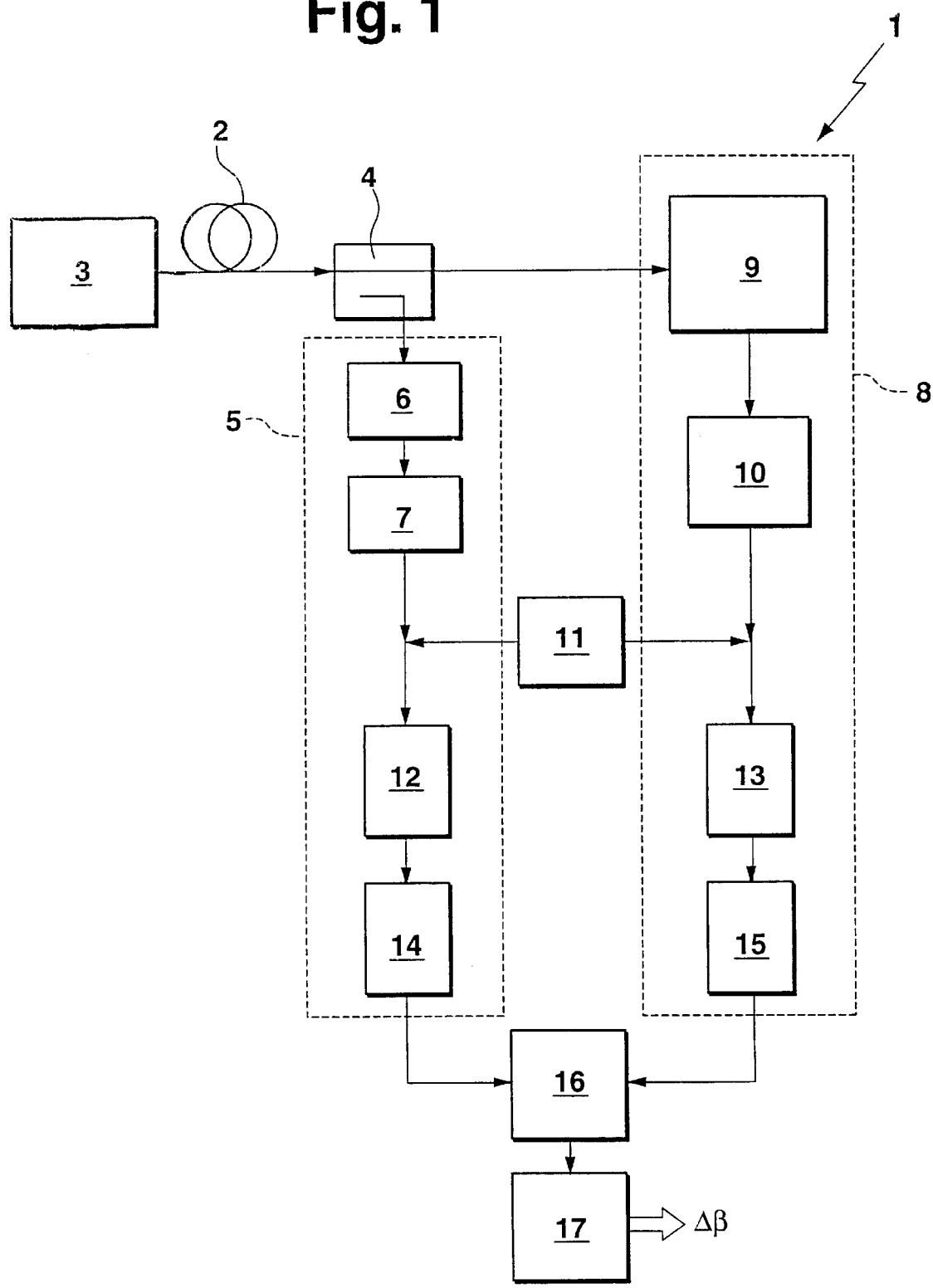
FIG. 1 shows schematically the inventive arrangement for measuring the chromatic dispersion.

The arrangement shown in FIG. 1, which is in total denominated with 1, serves for measuring the chromatic dispersion of an optical transmission link, which is formed by a light waveguide 2 (for example glass fiber) in the embodiment shown.

The light waveguide 2 is connected to a broadband optical light source 3 at one end, which is internally amplitude modulated with, compared to the optical frequencies, a lower frequency, for example with 20 MHz.

At the other end, the light waveguide 2 is connected to a device 4, which separates the optical signal transmitted in the light waveguide 2 into two paths: 10% of the power run in a reference path 5 via a fixed broadband optical filter 6 into a photo detector 7 (for example a PIN diode). The demodulated 20 MHz signal at the exit thereof is needed for reference purposes. The fixed filter 6 has the task of constricting the optical bandwidth of the received signal such that cancelling out of the modulation signal due to chromatic dispersion is avoided. In practice, the bandwidth of the optical filter 6 could, for example, be 30 nm. In many cases this filter can be completely eliminated, if the light source 3 is suitably chosen.

The other 90% of power are destined for the actual measuring path 8 and pass through a tuneable narrowband optical filter 9. At the exit of the filter 9 one finds a filtered narrow spectral component of the transmitted spectrum, which has a propagation time differing from the reference path 5 due to the chromatic dispersion of the light waveguide 2 (test sample). The filtered measuring signal is significantly weaker than the reference signal due to the small bandwidth of the tuneable filter 9. Therefore, a highly sensitive photo detector 10 with APD receiver (avalanche photo diode) is needed for the measuring path 8. Behind the photo detector 10 one finds again the 20 MHz signal, which, however, shows a phase shift compared to the reference signal because of the propagation time difference due to dispersion. In order to measure the phase shift, at first both 20 MHz signals are transferred into a lower frequency range (for example 11 kHz) through frequency mixing by means of a frequency source 11 connected to both paths 5, 8. There are few requirements on the phase sensitivity of the frequency source 11 since its influence is effective to the same extent in the reference path 5 and in the measuring path 8, and should be cancelled out during the phase measurement. Nevertheless, at this point a stable quartz oscillator is recommended since the intermediate frequency of 11 kHz is not obtained with sufficient accuracy otherwise. This is particularly important, if band limiting filters are still necessary on the 11 kHz level. The transferred signals are each amplified by an amplifier 12, 13 and amplitude limited by a limiter 14, 15, in order for the amplitude of the measuring signal not to enter the measurement result, and are finally fed into a digital phase measuring device 16. A downstream low-pass filter 17 with low cut-off frequency (for example 50 Hz) averages out noise to a large extent.

Figure 2:
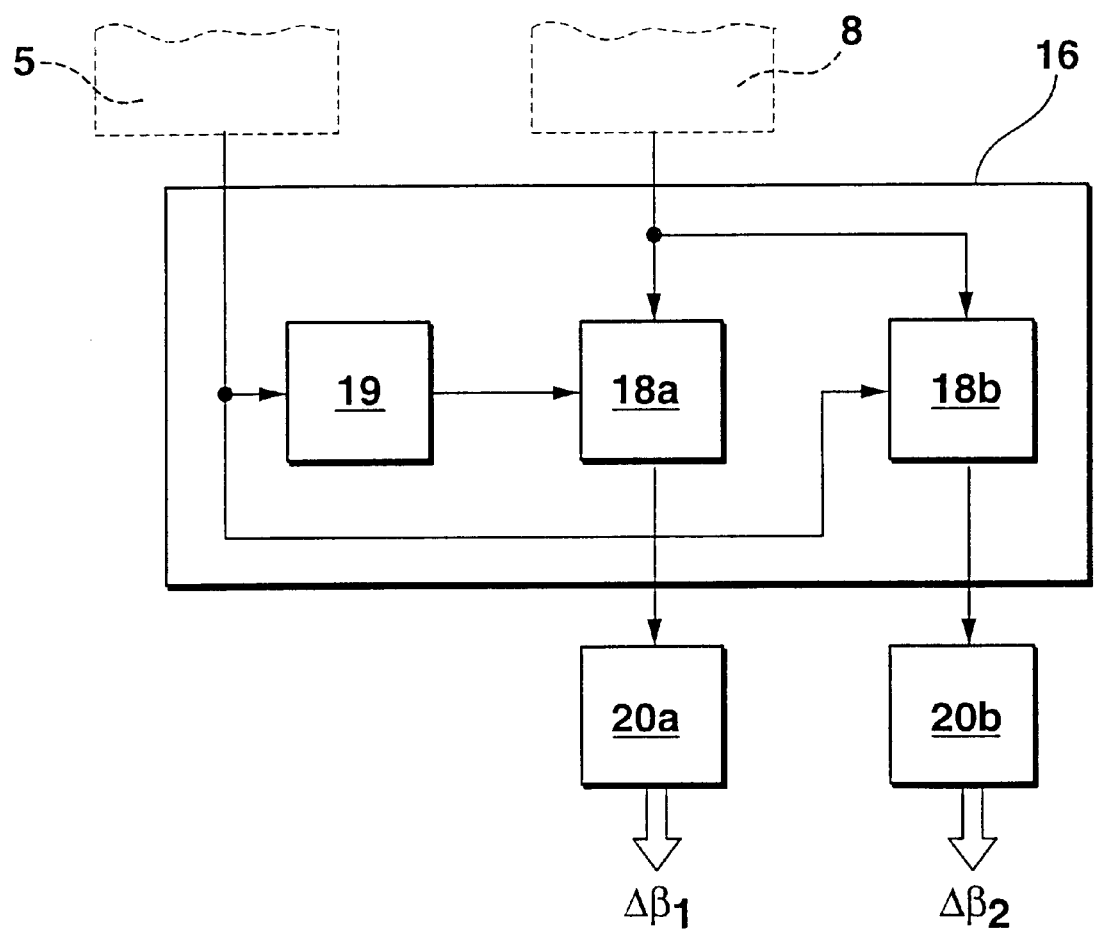
FIG. 2 shows schematically a particularly advantageous embodiment of the phase measurement device used in the measuring arrangement in FIG. 1.

As shown in FIG. 2, the phase measuring device 16 comprises two identical phase meters 18a, 18b the characteristic curves of which are offset to one another by 180° by means of an inverter 19 preceding the phase meter 18a. The two amplitude limited signals of the reference and the measuring path 5, 8 are fed into the two phase meters 18a, 18b respectively. In order for noise potentially contained in the signal not to be noticed as phase jitter after delimitation and comparison and in order for it not to lead to a noise-infested output voltage, a low-pass filter 20a, 20b with low cut-off frequency (e.g. 50 Hz) is disposed behind the phase meters 18a, 18b respectively, which averages out noise to a large extent.

The measuring procedure at the light waveguide 2 occurs as follows:

The light waveguide 2 is fed with the amplitude modulated broadband signal of the light source 3. At the receiving side the optical filter 9 is continually tuned in the range 1500 nm through 1600 nm (for example triangular wobbling). The actual value of the wavelength $\lambda$ is measured. In parallel, the output voltage of the phase measuring device 16, i.e. the phase difference $\Delta\beta$, or the output voltages of the phase meters 18a, 18b, i.e. the phase differences $\Delta\beta1$ and $\Delta\beta2$, are recorded. The functions $\Delta\beta=f(\lambda)$ obtained in such a fashion are cleared of noise by averaging over several wobble runs. The measuring results in the vicinity of phase meter irregularities are discarded. The derivation $d(\Delta\beta)/d\lambda$ is then calculated from the remaining measuring data. The dispersion coefficient D is then obtained by taking into consideration the length L of the light waveguide 2.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A method for measuring the chromatic dispersion of an optical transmission link, comprising:

transmitting an amplitude modulated broadband optical signal through the optical transmission link to be measured;

separating the transmitted signal at a receiving end of the optical transmission link into a reference path, in which the modulation frequency is demodulated out of the transmitted signal, and a measuring path, in which the transmitted signal is demodulated at several optical frequencies respectively; and determining the chromatic dispersion of the optical transmission link from the phase differences between the several demodulated signals of the measuring path and the demodulated signal of the reference path.

2. The method according to claim 1, wherein more than 50% of the transmitted signal power is coupled to the measuring path.

3. The method according to claim 1, wherein the step of determining the chromatic dispersion includes transferring the demodulated signals to a lower frequency range prior to measuring the phase differences.

4. The method according to claim 2, wherein the step of determining the chromatic dispersion includes transferring the demodulated signals to a lower frequency range prior to measuring the phase differences.

5. An apparatus for measuring the chromatic dispersion in an optical transmission link, comprising:

an amplitude modulated broadband light source coupled to the input side of the optical transmission link to be measured;

a separation device that separates the optical signal transmitted through the optical transmission link into a reference path and a measuring path;

a tuneable narrowband optical filter provided in the measuring path;

a photo detector disposed in the reference path and another photo detector in the measuring path, the photo detector at the reference path demodulating the modulation frequency out of the transmitted optical signal; and a phase measuring device provided at the output side of the two photo detectors to determine the phase differences respectively present between the reference and measuring paths, from which the chromatic dispersion of the optical transmission link is to be determined.

6. The apparatus according to claim 5, further comprising a broadband optical filter provided upstream of the photo detector in the reference path.

7. The apparatus according to claim 5, further comprising a frequency source connected to the reference path and the measuring path, which transfers the demodulated signals of both paths into a lower frequency range by frequency mixing.

8. The apparatus according to claim 5, wherein the phase measuring device comprises two phase meters, the characteristic curves of which are offset to one another.

9. The apparatus according to claim 5, further comprising:

a broadband optical filter provided upstream of the photo detector in the reference path;

a frequency source connected to the reference path and the measuring path, which transfers the demodulated signals of both paths into a lower frequency range by frequency mixing; and wherein the phase measuring device comprises two phase meters, the characteristic curves of which are offset to one another.

* * * * *